June 3, 1952 G. L. GRUNDMANN 2,598,909

REGULATED HIGH-VOLTAGE SUPPLY

Filed May 29, 1948

INVENTOR
Gustave L. Grundmann
BY
[signature]
ATTORNEY

Patented June 3, 1952 2,598,909

UNITED STATES PATENT OFFICE 2,598,909

REGULATED HIGH-VOLTAGE SUPPLY

Gustave L. Grundmann, Westmont, N. J., assignor to Radio Corporation of America, a corporation of Delaware Application May 29, 1948, Serial No. 29,995

7 Claims. (Cl. 315—27)

This invention relates to high voltage supplies and more particularly to voltage regulation in high voltage supplies suitable for television systems and the like.

Television receivers and other cathode ray equipment require power supplies capable of producing relatively high voltages at low current consumption. The high voltage is employed for the acceleration of the electron beam in the image reproducing device to a high velocity in order to provide a bright image.

The employment of high voltages in home television receivers has certain fundamental requirements which are not generally necessary for normal commercial high voltage generation. Among others, one generally important requirement consists of the shut-off of high voltage when other of the circuits in the television receiver have failed. The reason for this requirement will be readily understood when it is appreciated that the continuation of the high voltage or acceleration of the electron beam after the failure of deflection circuits will likely cause damage to the image reproducing device as a result of continued bombardment by the electron beam at one spot on the image tube screen. For this reason, the "kickback" or "flyback" type of high voltage power supply has become very popular.

Although current requirements are small, the regulation must be good. A poor regulation of the high voltage supply for television receivers and the like cannot be tolerated in view of the fact that a large reduction in second anode voltage will not only reduce the brilliance of the image, but will cause a reduction in size of the image, and if such change in high voltage output is relatively rapid, a serious shape distortion to the image will result.

According to this invention, there is provided an improved high voltage supply with voltage control.

According to this invention, a pair of sources of electrical pulses oppositely polarized are utilized. One of the sources is connected to the high voltage terminal through a condenser, while the other source is connected to the high voltage terminal through a rectifier. This circuit arrangement adds the pulses to form a voltage addition. An arrangement is also provided to control the amplitude of the pulses in one of the sources for purposes of regulation. The arrangement is particularly adapted for employment as a second anode supply in television receivers.

A primary object of this invention is to provide an improved high voltage power supply.

Another object of this invention is to increase the voltage output of a power supply.

Still another object of this invention is to improve regulation of a high voltage power supply.

A still further object of the invention is to provide an improved television system.

Other and incidental objects of the invention will be apparent to those skilled in the art from a reading of the following specification and an inspection of the accompanying drawing in which:

Figure 3 illustrates by circuit diagram another form of this invention as applied to pulse type power supplies such as employed in television receivers and the like.

Figure 1:
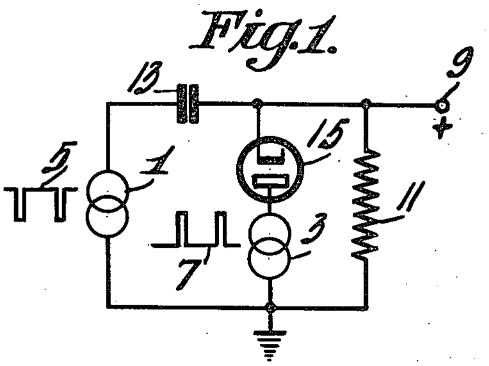
Figure 1 shows this invention in one of its simplest forms.

Turning now in more detail to Figure 1, there is illustrated schematically a pair of pulse type sources of electrical energy 1 and 3. It will be noticed by examination of the voltage curve associated with each of the power sources 1 and 3 that they generate voltage pulses of opposite polarity. The timing of pulses 5 and 7 must be such that they are substantially synchronous.

An output circuit includes a high voltage terminal 9 and a bleeder resistance 11. A condenser 13 is also included in the circuit, together with a diode 15. Although a diode is shown, any suitable rectifying element may be employed in the practice of this invention.

The operation of this invention will best be understood after a brief description of the operation of a simple form of the invention, as illustrated in Figure 1. An examination of the circuit including the pair of pulse sources 1 and 3, the condenser 13 and the diode 15 will indicate that condenser 13 will be charged by an amount equal to the sum of the pulses 5 and 7. The interval between pulses will permit the condenser 13 to discharge through resistance 11, but during that interval the cathode of diode 15 will be at a positive potential with respect to its associated anode, so therefore no current will flow through the diode 15.

Although filter capacitance and series resistance will be included in the circuit following the output terminal 9, it is not shown in the drawing.

Figure 2:
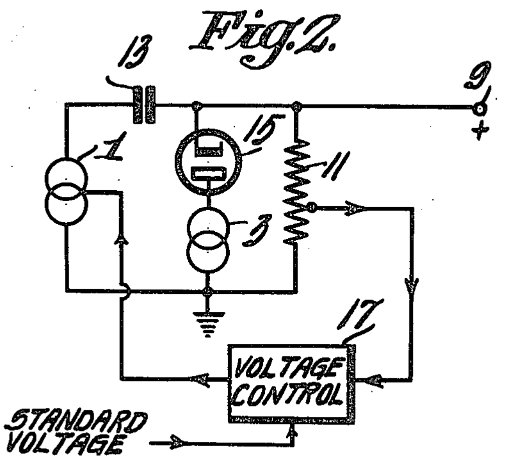
Figure 2 shows this invention in another of its simplest forms including voltage regulation.

Turning now to Figure 2, wherein like numerals refer to similar elements, a voltage control arrangement 17 is included to control the pulse source 1. An output voltage sample may, for comparison, be provided by a tap on the output bleeder 11. Although not shown in detail, voltage control 17 may take any of the well known forms. An arrangement employing a vacuum tube is shown in detail in Figure 3. Voltage control 17 may also be applied to the pulse source 3.

Figure 3:
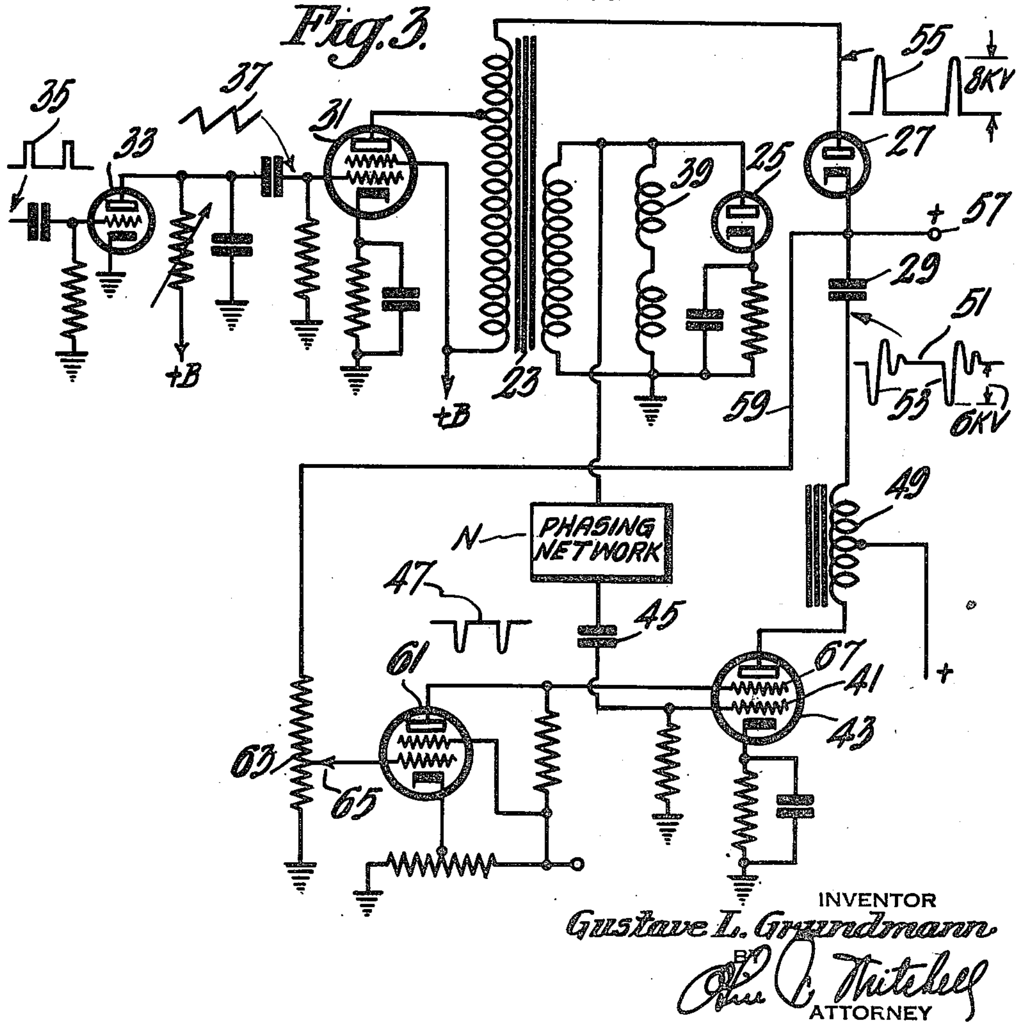

Turning now to Figure 3, there is illustrated by circuit diagram a pulse type power supply for television receivers and the like.

The arrangement shown is of the "kickback" or "flyback" type of power supply. The arrangement shown is especially adapted for and has a maximum utility for television receivers incorporating magnetic deflection.

Perhaps the present invention may best be understood by a brief description, first of all, of the principles of operation of the kickback supply. In the explanation of the operation of the kickback supply, it is best that the action taking place during the scanning of the television image be reviewed briefly.

It will be remembered that each complete frame of a television image which is scanned is made up of 525 individual scanning lines. Each time the beam reaches the right side of the image, it is extinguished and quickly returned to the left side. This quick return is called the kickback or flyback period. The energy utilized in the deflection system during this flyback period is employed to generate high voltage. The flyback voltage is caused by allowing the magnetic field of the deflection yoke to collapse very rapidly. The rapid collapse in the magnetic field causes the primary of the deflection transformer 23 to break into oscillation at its natural resonant frequency of about 100 kc. The oscillations are permitted to continue for only the positive half cycle in the primary of transformer 23, after which they are damped out in damper tube 25 in the manner well known in the television art. However, this positive half cycle which is developed across the primary of transformer 23 may be of the order of 9,000 volts. This 9,000 volts is applied to the plate of the diode 27 and rectified to charge condenser 29.

Transformer 23 receives its energy from tube 31, often called the power output tube. The power output tube 31 obtains a sawtooth wave through tube 33 and its associated sawtooth wave generator circuit. Graphic illustrations are shown to indicate the incoming signal pulses 35 and the sawtooth wave voltage 37. Although one type of deflection generator is illustrated, any suitable type may be employed in the practice of this invention without departing from the spirit thereof.

It is possible, however, to increase the amount of voltage developed across condenser 29 by utilizing a second source of pulses which may be obtained across the deflecting coils 39. A connection is made from deflection coils 39 to the control electrode 41 of tube 43 through condenser 45.

The pulses indicated graphically in curve 47 are applied to the control electrode 41 of tube 43. By placing a transformer 49 in the output circuit of tube 43, a voltage wave 51 may be obtained.

It is important, however, that the negative pulse 53 of voltage curve 51 correspond in time to the positive pulse 55 of the pulses applied to diode 27.

It therefore follows that the pulses 55 applied to condenser 29 through diode 27 are analogous to the source of pulses indicated schematically as 3 in Figure 1. Likewise, the pulses 53 furnished condenser 29 by transformer 49 may be analogous to the source of pulses illustrated at 1 of Figure 1.

It will be seen, therefore, in accordance with the description of Figure 1 that the output potential at high voltage terminal 57 will be higher than if only the source employing diode 27 were employed.

In accordance with the invention, a sample of the high voltage is obtained through lead 59 and applied to tube 61 through a bleeder resistance 63. By suitable circuit arrangements, the potential at the tapped point 65 of bleeder resistance 63 can be made to control the power supplied by tube 43 through its associated auxiliary control electrode 67. The circuit arrangement can be properly phased as shown in order that the higher the potential across bleeder resistance 63, the less power will be furnished by tube 43.

Although the drive for tube 43 is obtained across the deflection coil 39, the drive is, in other forms of this invention, obtained from the input circuit of tube 31 or the input circuit of tube 33. It is important to remember that the pulses 55 and 51 should be oppositely polarized and substantially synchronous with one another.

Phasing network N may be included in the sources of pulses to properly adjust their phase. Phasing networks are well known to the art and need no detailed description here. For delay lines see an article entitled "Video Delay Lines," beginning on page 1580 of the "Proceedings of the Institute of Radio Engineers" for December, 1947.

In accordance with the form of the invention shown in Figure 3, it will be noticed that a sample of the output high voltage obtained from terminal 57 is compared to the voltage B+ at the bottom of the circuit diagram. The B+ voltage may be obtained from a regulator tube, if desired. The output of tube 61 controls the screen or auxiliary control voltage of tube 43, thus controlling the amplitude of the pulses 53. The phase of this feedback is such that the amplitude of pulses 53 will be less if the voltage at point 57 is high.

It is also possible to over-compensate the power supply. This may be desirable in operating certain projection tubes. Spot focus is best obtained if the kinescope focusing ratio is increased with increased beam current. This effect cannot be properly obtained unless over-compensation of the second anode supply voltage can be maintained.

It will be seen also that the employment of this invention permits change in size of deflection, such as for purposes of keystoning, without the resultant change in high voltage potential at terminal 57. This results by reason of the compensation afforded by the pulse source including tube 43, even though the high voltage potential furnished by pulse source including diode 27 does not maintain a uniform value. With the control as suggested, an increase in contribution by the pulse source including tube 43 can overcome the decrease in potential of the pulse source including diode 27 as a result of change in deflection which would necessarily affect the output voltage of the upper pulse source.

Having thus described the invention, what is claimed is:

1. A high voltage power supply for television systems and the like comprising in combination a first source of electrical pulses, a second source of electrical pulses, means for synchronizing said sources with each other said sources of electrical pulses connected to produce pulses having opposite polarity, said pulses being of short duration as compared to the time interval between pulses, an output circuit having a high voltage terminal, a diode having a cathode and an anode, a condenser, a pulse transfer connection between one of said sources of electrical pulses and said high voltage terminal through said condenser, and a pulse transfer connection between the other of said sources of electrical pulses and said high voltage terminal through said diode, said diode being polarized in a manner such that said diode cathode is connected to said high voltage terminal.

2. A high voltage power supply for television systems and the like comprising in combination a first source of electrical pulses, a second source of electrical pulses, said sources of electrical pulses connected to produce pulses having opposite polarity, said pulses being of short duration as compared to the time interval between pulses, an output circuit having a high voltage terminal, a diode having a cathode and an anode, a condenser, a connection between one of said sources of electrical pulses and said high voltage terminal through said condenser, a connection between the other of said sources of electrical pulses and said high voltage terminal through said diode, said diode being polarized in a manner such that said diode cathode is connected to said high voltage terminals, and a voltage control connection between said high voltage terminal and one of said sources of electrical pulses.

3. A regulated high voltage supply for television systems and the like comprising in combination a first source of electrical pulses, a second source of electrical pulses, the pulses of said second source polarized oppositely to the pulses of said first source, at least one of said sources including a tube having a control electrode, an output circuit having a high voltage terminal, a diode having a cathode and an anode, a condenser, a connection between one of said sources of electrical pulses and said high voltage terminal through said condenser, a connection between the other of said sources of electrical pulses and said high voltage terminal through said diode, said diode being polarized in a manner such that said diode cathode is connected to said high voltage terminal, and a voltage control connection between said high voltage terminal and said control electrode.

4. A power supply comprising in combination a pair of sources of electrical pulses having oppositely polarized pulses, said pulses being of short duration as compared to the time interval between pulses, at least one of said sources including a tube having an auxiliary control electrode, an output circuit having a high voltage terminal, a diode having a cathode and an anode, a condenser, a connection between one of said sources of electrical pulses and said high voltage terminal through said condenser, a connection between the other of said sources of electrical pulses and said high voltage terminal through said diode, said diode being polarized in such a manner that said diode cathode is connected to said high voltage terminal, and a voltage control connection between said high voltage terminal and said auxiliary control electrode.

5. A power supply comprising in combination a pair of sources of electrical pulses having oppositely polarized pulses, said pulses being of short duration as compared to the time interval between pulses, at least one of said sources including a tube having an auxiliary control electrode, an output circuit having a high voltage terminal, a diode having a cathode and an anode, a condenser, a connection between one of said sources of electrical pulses and said voltage terminal through said condenser, a connection between the other of said sources of electrical pulses and said high voltage terminal through said diode, said diode being polarized in a manner such that said diode cathode is connected to said high voltage terminal, and a voltage control connection between said high voltage terminal and said auxiliary control electrode through a resistance element connected between said terminal and a point of constant potential.

6. A regulated high voltage supply for television systems of the type employing a cathode ray deflection signal generator comprising in combination a pair of sources of electrical pulses having synchronously occurring and oppositely polarized pulses, said pulses being of short duration as compared to the time interval between pulses, one of said sources comprising said deflection signal generator, an output circuit having a high voltage terminal, a diode having a cathode and an anode, a condenser, a connection between one of said sources of electrical pulses and said high voltage terminal through said condenser, and a connection between the other of said sources of electrical pulses and said high voltage terminal through said diode, said diode being polarized in a manner such that said diode cathode is connected to said high voltage terminal, both of said sources connected to obtain energy from said deflection system.

7. A regulated high voltage supply for television systems of the type employing a cathode ray deflection signal generator and an associated deflection coil, said supply comprising in combination a pair of sources of electrical pulses having synchronously occurring and oppositely polarized pulses, said pulses being of short duration as compared to the time interval between pulses, and wherein at least one of said sources is connected to receive a portion of the energy applied to said deflection coil, an output circuit having a high voltage terminal, a diode having a cathode and an anode, a condenser, a connection between one of said sources of electrical pulses and said high voltage terminal through said condenser, and a connection between the other of said sources of electrical pulses and said high voltage terminal through said diode, said diode being polarized in a manner such that said diode cathode is connected to said high voltage terminal, both of said sources connected to obtain energy from said deflection system.

GUSTAVE L. GRUNDMANN.

REFERENCES CITED

The following references are of record in the file of this patent:

UNITED STATES PATENTS

| Number | Name | Date |
|---|---|---|
| 2,074,495 | Vance | Mar. 23, 1937 |
| 2,182,608 | Andrieu | Dec. 5, 1939 |
| 2,212,217 | White et al. | Aug. 20, 1940 |
| 2,251,851 | Moore | Aug. 5, 1941 |
| 2,260,546 | Tingley | Oct. 28, 1941 |
| 2,383,333 | Milward | Aug. 21, 1945 |
| 2,473,432 | Johnston | June 14, 1949 |
| 2,489,312 | Pacini | Nov. 29, 1949 |